(12) United States Patent
Yu et al.

(10) Patent No.: US 7,995,850 B2
(45) Date of Patent: Aug. 9, 2011

(54) METHOD AND DEVICE FOR SELECTING TRANSFORM MATRICES FOR DOWN-SAMPLING DCT IMAGE USING LEARNING WITH FORGETTING ALGORITHM

(75) Inventors: Xiang Yu, Waterloo (CA); En-hui Yang, Waterloo (CA); Haiquan Wang, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 663 days.

(21) Appl. No.: 12/133,083

(22) Filed: Jun. 4, 2008

(65) Prior Publication Data

US 2008/0298700 A1    Dec. 4, 2008

Related U.S. Application Data

(60) Provisional application No. 60/941,809, filed on Jun. 4, 2007.

(51) Int. Cl.
*G06K 9/36* (2006.01)
(52) U.S. Cl. .................................. 382/250; 382/298
(58) Field of Classification Search .......... 382/250–253, 382/298–299
See application file for complete search history.

(56) References Cited

U.S. PATENT DOCUMENTS

| | | | | |
|---|---|---|---|---|
| 5,845,015 A * | 12/1998 | Martucci | ............. | 382/250 |
| 6,473,207 B1 * | 10/2002 | Miyamoto | ............. | 358/539 |
| 6,990,241 B2 * | 1/2006 | Natarajan et al. | ............. | 382/233 |
| 7,062,098 B1 * | 6/2006 | Mitchell et al. | ............. | 382/235 |
| 7,412,100 B2 * | 8/2008 | Raveendran et al. | ............. | 382/233 |

FOREIGN PATENT DOCUMENTS

| | | |
|---|---|---|
| WO | W098/41929 | 9/1998 |
| WO | WO 9841929 | 9/1998 |
| WO | W003/021530 | 3/2003 |
| WO | WO 03056837 | 7/2003 |
| WO | WO 2006091041 | 8/2006 |

OTHER PUBLICATIONS

Merhav et al., "Fast Algorithm for DCT-Domain Image Down-Sampling and for Inverse Motion Compensation", IEEE Transactions on Circuits and Systems for Video Technology, pp. 468-476, vol. 7, No. 3, Jun. 1997.
Patil et al., "A fast Arbitrary Factor Video Resizing Algorithm", IEEE Transactions on Circuits and Systems for Video Technology, pp. 1164-1171, vol. 16, No. 9, Sep. 2006.

(Continued)

*Primary Examiner* — Jingge Wu
(74) *Attorney, Agent, or Firm* — Rowand Intellectual Property Law

(57) ABSTRACT

Down-sampling of an image may be performed in the DCT domain. A multiple layered network is used to select transform matrices for down-sampling a DCT image of size M×N to a DCT image of size I×J. A spatial domain down-sampling method is selected and applied to the DCT image to produce a down-sampled DCT reference image. A learning with forgetting algorithm is used to apply a decay to the elements of the transform matrix and select a transform matrices which solve an optimization problem. The optimization problem is a function of the visual quality of images obtained using the transform matrices and the computational complexity associated with using the transform matrices. The visual quality is a measure of the difference between the down-sampled DCT image obtained using the transform matrices and the visual quality of the DCT reference image obtained using a spatial domain down-sampling method.

20 Claims, 8 Drawing Sheets

OTHER PUBLICATIONS

B.K. Natarajan, V. Bhaskaran, "Fast Approximate Algorithm for Scaling Down Digital Images in the DCT Domain", in Proc. IEEE Int. Conf. Image Processing ,1995, pp. 241-243, Palo Alto, California, USA.

J.B. Lee, A. Eleftheriadis, "2-D Transform-Domain Resolution Translation", IEEE Transactions on Circuits and Systems for Video Technology , pp. 704-714, vol. 10, No. 5, Aug. 2000.

M. J. Riely, and Ian E.G. Richardson, Digital Video Communications, pp. 90-105, Artech House, Boston, 1997.

S.F. Chang, D.G. Messerschmitt, "Manipulation and Compositing of MC-DCT Compressed Video", IEEE Journal on Selected Areas in Communications, pp. 1-11, vol. 13, No. 1, Jan. 1995.

R. Dugad, and N. Ahuja, "A Fast Scheme for Image Size Change in the Compressed Domain", IEEE Transactions on Circuits and Systems for Video Technology, pp. 461-474, vol. 11, No. 4, Apr. 2001.

H.W. Park, Y.S. Park, and S.K. Oh, "L/M-Fold Image Resizing in Block-DCT Domain using Symmetric Convolution", IEEE Transactions on Image Processing, pp. 1016-1034, vol. 12, No. 9, Sep. 2003.

Y.S. Park, H.W. Park, "Design and Analysis of an Image Resizing Filter in the Block-DCT Domain", IEEE Transactions on Circuits and Systems for Video Technology, pp. 274-279, vol. 14, No. 2, Feb. 2004.

Y.S. Park, and H.W. Park, "Arbitrary-Ratio Image Resizing using Fast DCT of Composite Length for DCT-based Transcoder" IEEE Transactions on Image Processing, pp. 494-500, vol. 15, No. 2, Feb. 2006.

H. Shu, L-P. Chau, "The realization of arbitrary downsizing video transcoding", IEEE Transactions on Circuits and Systems for Video Technology pp. 540-546, vol. 16, Issue 4, Apr. 2006.

A.K. Jain, Fundamentals of Digital Image Processing Prentice Hall, 1989, pp. 16-27, 84-99,132-149, Englewood Cliff, New Jersey.

F.L. Luo and R. Unbehauen, Applied Neural Networks for Signal Processing Cambridge University Press, United Kingdom, pp. 32-73, 1997.

M. lshikawa, "Structural Learning with Forgetting" Neural Networks, vol. 9, No. 3, pp. 509-521, Great Britain, 1996.

W.K. Pratt, Digital Image Processing, John Wiley & Sons, Inc., USA, pp. 93-99, 112-119, 132-135, 229-241, 1991.

Ishikawa M: "Structural Learning with Forgetting" Neural Networks,Elsevier Science Publishers, Barking,GB LNKD-D01:10.1016/0893-6080(96)83696-3, vol. 9, No. 3, Apr. 1, 1996, pp. 509-521.

Karl Ni et al: "Learning the Kernel Matrix for Superresolution" Multimedia Signal Processing, 2006 IEEE 8th Workshop on. IEEE., PI, Oct. 1, 2006, pp. 441-446, XP031011099.

Patil V et al: "A fast Arbitrary Factor Video Resizing Algorithm" IEEE Transactions on Circuits and Systems for Video Technology,IEEE Service Center, Piscataway, NJ, US LNO D01:10.1109/TCSVT,2006-881859, vol. 16,No. 9, Sep. 1, 2006, pp. 1164-1171.

Merhav N et al: "Fast Algorithms for DCT-Domain Image Down-Sampling and for Inverse Motion Compensation" IEEE Transactions on Circuits and Systems for Video Technology, IEEE Service Center, Piscataway, NJ, US LNKD D01;10.1109/76,585926, vol. 7,No. 3,Jun. 1, 1997, pp. 468-476.

Supplementary European Search Report dated Aug. 9, 2010.

Balas K Natarajan et al: "A Fast Approximate Algorithm for Scaling Down Digital Images in the DCT Domain", proceedings of the International Conference on Image Processing. (ICIP). Washington, Oct. 23-26, 1995; Los Alamitos, IEEE Comp. Soc. Press, US vol. 2, Oct. 23, 1995, pp. 241-243, XP000609934.

Daugman J G Ed—Institute of Electrical and Electronics Engineers: "Relation Neural Network for Non-Orthogonal Image Transforms" Proceedings of the International Conference on Neural Networks. San Diego, Jul. 24-27, 1988, New York, IEEE, US, vol.-, Jul. 24, 1988, pp. 547-560, XP000118216.

Ishikaw M: "Structural Learning with Forgetting" Neural Networks, Elsevier Science Publishers, Barking, GB 3, vol. 9, No. 3, Apr. 1, 1996, pp. 509-521, XP004017650.

Merhav N et al: "A transform Domain Approach to Spatial Domain Image Scaling" 1996). Atlanta, May 7-10, 1996; New York, IEEE, US, vol. 4, May 1, 1996, pp. 2403-2406, XP000669702.

Bhaskaran V: "Mediaprocessing in the Compressed Domain" Digest of Papers. Compcon, Feb. 25, 1996, pp. 204-209, XP000578463.

Shih-Fu Chang et al: "Manipulation and Compositing of MC-DCT Compressed Video" IEEE Journal on Selected Areas in Communications, IEEE Service Center, Piscataway, US, vol. 13, No. 1, Jan. 1, 1995, pp. 1-11, XP000492740.

* cited by examiner

METHOD AND DEVICE FOR SELECTING TRANSFORM MATRICES FOR DOWN-SAMPLING DCT IMAGE USING LEARNING WITH FORGETTING ALGORITHM

FIELD OF THE INVENTION

The present invention relates to image manipulation and more particularly to the down-sampling of an image to obtain an image having a smaller size.

BACKGROUND OF THE INVENTION

As wireless and wired network connectivity is rapidly expanding and the number of network users is steadily increasing, there has been great momentum in the multimedia industry for supporting content display in a wide variety of network connected devices. This is complicated, however, due to the great diversity of devices with various display resolutions. The range of devices includes both standard and high-definition computer monitors with large displays, and smart phone devices with smaller displays. Accordingly, it is often necessary to down-sample an image to a size which may be displayed on a given device. Down-sampling may also be desirable in order to minimize the bandwidth or time required to transfer an image over a network. This is particularly a concern where the image is being transferred over a wireless medium.

Many image and video types represent images or video in a Discrete Cosine Transform ("DCT") domain. For example the JPEG, MPEG, DV and MJPEG image and video types represent images or videos in the DCT domain. Where the image or video is represented in a DCT domain, down-sampling is particularly difficult.

Typically, down-sampling a DCT image or video involves first converting DCT data to a spatial domain using an inverse DCT operation and applying a standard down-sampling method in the spatial domain. After the image is down-sampled in the spatial domain it is typically converted back to the DCT domain using a DCT operation. Due to the use of the DCT and the inverse DCT, methods which down-sample a DCT image or video by first converting it back to the spatial domain typically have a large computational complexity. A large computational complexity results in a longer calculation and a calculation which utilizes more processor time and power.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
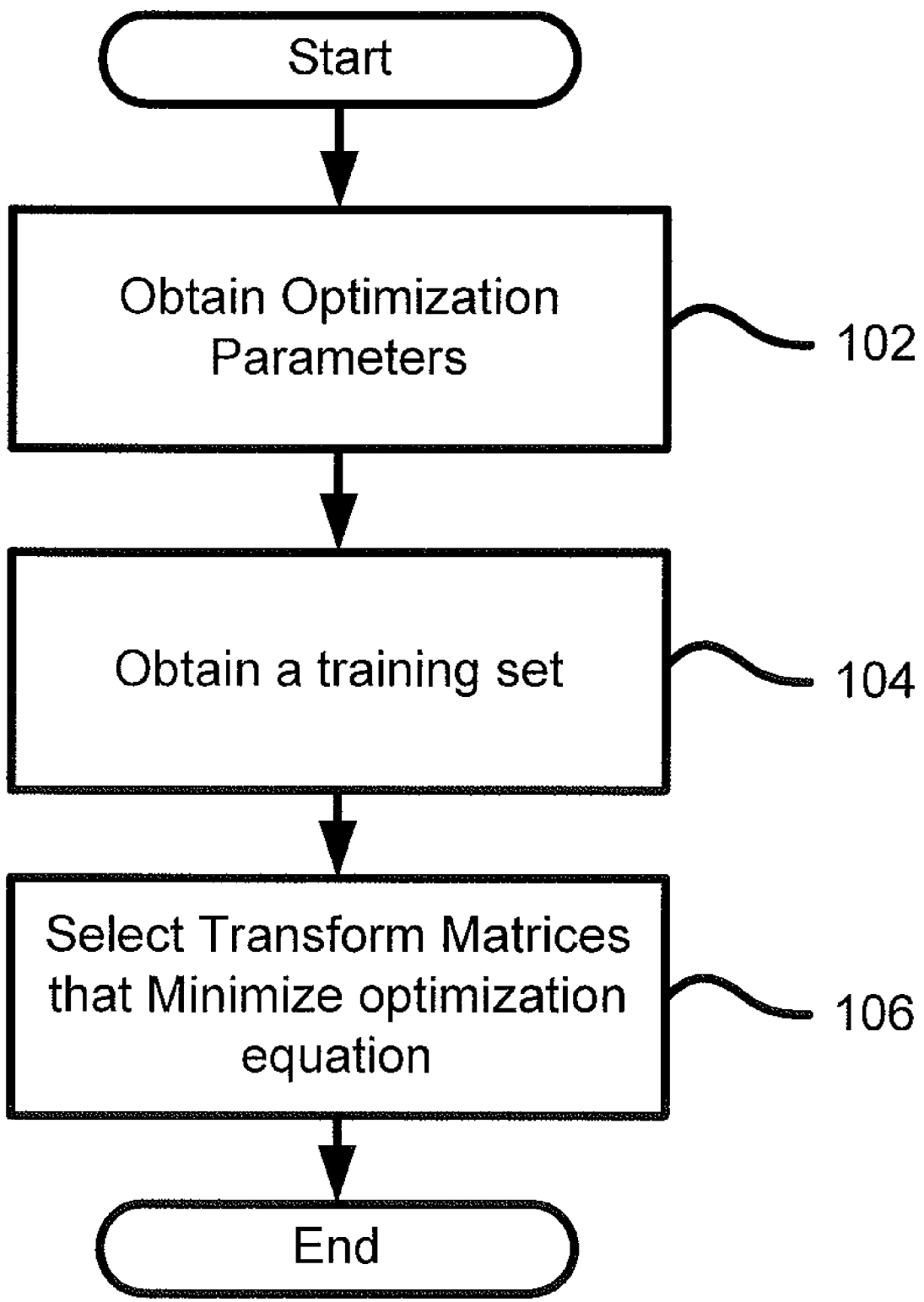
FIG. 1 shows a method of obtaining transforming matrices for down-sampling a DCT image according to one aspect of the present application.

In one embodiment of the present application, a method is provided for down-sampling a DCT image of size M×N directly in a DCT domain by applying two transform matrices. The first matrix, called a row transform matrix, $D_{IM}$, is used to down-sample the number of rows in the DCT image. That is, it may be used to convert a DCT image, $C_{MN}$, with M rows into a DCT matrix with I rows. The number of columns in the row transform matrix is equal to the number of rows in the DCT image. The second matrix, called a column transform matrix, $W_{NJ}$, is used to down-sample the number of columns in the DCT image. That is, it may be used to convert a DCT image with N columns into a DCT matrix with J columns. The number of rows in the column transform matrix is equal to the number of columns in the DCT image. Accordingly, the row transform matrix is of a size I×M and the column transform matrix is of size N×J.

The DCT image, $C_{MN}$, may be any DCT image including, for example, a JPEG image. In some instances the DCT image may represent a portion of a video, such as a frame of a video. For example, the DCT image may be a single frame of a video of the DV video type.

A down-sampled DCT image is obtained using the transform matrices by multiplying the row transform matrix, $D_{IM}$, with the product of the DCT image, $C_{MN}$, and the column transform matrix, $W_{NJ}$. The down-sampled DCT image may be obtained using a transformation formula:

$$D_{IM} \cdot C_{MN} \cdot W_{NJ}$$

Since one of the transform matrices is applied to the DCT image on each side of the DCT image, the transform matrices may be called linear transform double sided matrices (LTDS). That is, one of the transform matrices is applied to the left of the DCT image in the transformation formula and one is applied to the right of the DCT image in the transformation formula. In this case, the row transform matrix is applied to the left of the DCT image and the column transform matrix is applied to the right of the DCT image.

A wide range of spatial-domain down-sampling methods may be represented as a LTDS in the DCT domain. For example, in one embodiment, the transform matrices may be determined as:

$$D_{IM} = T_{II,t} \cdot E_{IM} \cdot A^*_{MM} \cdot L_{MM} \cdot A_{MM} \cdot T_{MM,t'} \text{ and } W_{NJ} = T_{NN,t} \cdot B_{NN} \cdot R_{NN} \cdot B^*_{NN} \cdot G_{NJ} \cdot T_{JJ,t'},$$

where $T_{SS}$ is a matrix of size S×S and which is equal to:

$$T_{SS,t} = \begin{pmatrix} [t] & 0 & 0 \\ 0 & \ddots & 0 \\ 0 & 0 & [t] \end{pmatrix}, \text{ where}$$

t is a DCT matrix.

$E_{IM}$ and $G_{NJ}$ are linear interpolation matrices for use in down-sampling in the spatial domain, and $A_{MM}$ is an M×M DFT transform matrix with its element given by $$a_{uv} = \frac{1}{\sqrt{M}} \exp\left(\frac{-j2\pi uv}{M}\right), u = 0, 1, \ldots, M-1, v = 0, 1, \ldots, M-1 \text{ and}$$

$A^*_{MM}$ is its conjugate. Similarly, $B_{NN}$ is an N×N DFT transform matrix and $B^*_{NN}$ is its conjugate matrix. $L_{MM}$ and $R_{NN}$ are diagonal matrixes with diagonal elements being $L_{M1}$ and $R_{1N}$ respectively. $L_{M1}$ and $R_{1N}$ are two one-dimensional filters.

The LTDS representation above may be obtained by concatenating the inverse DCT, spatial domain down-sampling of a certain format, and the DCT. More specifically, a spatial domain image $X_{MN}$ may be obtained by applying an inverse DCT to a DCT image $C_{MN}$: $X_{MN} = t' \square C_{MN} \square t$, where t is a DCT matrix, t' is a transpose of the DCT matrix and $\square$ denotes block-wise multiplications. Then, a spatial-domain method may be selected and used to down-sample $X_{MN}$ to obtain an I×J image, denoted as $x_{IJ}$. Finally, the DCT may be applied to the I×J image, resulting in $V_{IJ} = t \square x_{IJ} \square t'$, where $V_{IJ}$ is a down-sampled DCT image.

Generally, down-sampling in the spatial domain consists of two steps: low-pass filtering and interpolation. In some embodiments, a low pass filter may be implemented based on a 2D discrete Fourier transform (DFT). Given an image $X_{MN}$, the filtering output $\tilde{X}_{MN}$ is obtained by: $\tilde{X}_{MN} = A^*_{MM} ((A_{MM} \cdot X_{MN} \cdot B_{NN}) \otimes F_{MN}) \cdot B^*_{NN}$, where $A_{MM}$ is an M×M DFT transform matrix with its element given by $$a_{uv} = \frac{1}{\sqrt{M}} \exp\left(\frac{-j2\pi uv}{M}\right), u = 0, 1, \ldots, M-1, v = 0, 1, \ldots, M-1$$

and $A^*_{MM}$ is its conjugate. Similarly, $B_{NN}$ is an N×N DFT transform matrix and $B^*_{NN}$ is its conjugate matrix. $F_{MN}$ is the low-pass filtering matrix in the DFT domain and the symbol $\otimes$ denotes element wise multiplications.

If $F_{MN}$ is constructed using two one-dimensional filters (i.e. $F_{MN} = L_{M1} \cdot R_{1N}$) then the element wise multiplication may be removed, yielding $\tilde{X}_{MN} = A^*_{MM} \cdot L_{MM} \cdot (A_{MM} \cdot X_{MN} \cdot B_{NN}) \cdot R_{NN} \cdot B^*_{NN}$, where $L_{MM}$ and $R_{NN}$ are diagonal matrixes with diagonal elements being $L_{M1}$ and $R_{1N}$ respectively.

A linear interpolation filter may then be applied. The linear interpolation filter to be applied is in the form of interpolation matrices, $E_{IM}$, $G_{NJ}$. Therefore, the spatial domain down-sampled image may be computed as $$x_{IJ} = E_{IM} \cdot \tilde{X}_{MN} \cdot G_{NJ} = E_{IM} \cdot A^*_{MM} \cdot L_{MM} \cdot A_{MM} \cdot X_{MN} \cdot B_{NN} \cdot R_{NN} \cdot B^*_{NN} \cdot G_{NJ}$$

The concatenation of inverse DCT, spatial domain down sampling and DCT is therefore:

$$V_{IJ} = t \square [E_{IM} \cdot A^*_{MM} \cdot L_{MM} \cdot A_{MM} \cdot (t' \square C_{MN} \square t) \cdot B_{NN} \cdot R_{NN} \cdot B^*_{NN} \cdot G_{NJ}] \square t'$$

The block wise multiplication can then be replaced by applying a result of $$t \square C_{MN} = T_{MM,t} \cdot C_{MN}, \text{ where } T_{MM,t} = \begin{pmatrix} [t] & 0 & 0 \\ 0 & \ddots & 0 \\ 0 & 0 & [t] \end{pmatrix}$$

and t is a DCT matrix.

Consequently, a linear transform in the DCT domain can be obtained as:

$$V_{IJ} = D_{IM} \cdot C_{MN} \cdot W_{NJ} \text{ where } D_{IM} = T_{II,t} \cdot E_{IM} \cdot A^*_{MM} \cdot L_{MM} \cdot A_{MM} \cdot T_{MM,t}, \text{ and}$$

$$W_{NJ} = T_{NN,t} \cdot B_{NN} \cdot R_{NN} \cdot B^*_{NN} \cdot G_{NJ} \cdot T_{JJ,t'}.$$

That is, the row transform matrix may be represented as: $D_{IM} = T_{II,t} \cdot E_{IM} \cdot A^*_{MM} \cdot L_{MM} \cdot A_{MM} \cdot T_{MM,t'}$. Similarly, the column transform matrix may be represented as $W_{NJ} = T_{NN,t} \cdot B_{NN} \cdot R_{NN} \cdot B^*_{NN} \cdot G_{NJ} \cdot T_{JJ,t'}$. The row transform matrix and the column transform matrix may be obtained by determining a solution to the equations:

$$D_{IM} = T_{II,t} \cdot E_{IM} \cdot A^*_{MM} \cdot L_{MM} \cdot A_{MM} \cdot T_{MM,t'} \text{ and } W_{NJ} = T_{NN,t} \cdot B_{NN} \cdot R_{NN} \cdot B^*_{NN} \cdot G_{NJ} \cdot T_{JJ,t'}$$

Accordingly, in one aspect of the present application a method of down-sampling a DCT image is provided. In one embodiment, the method includes steps of determining a row transform matrix using the equation: $D_{IM} = T_{II,t} \cdot E_{IM} \cdot A^*_{MM} \cdot L_{MM} \cdot A_{MM} \cdot T_{MM,t'}$ and determining a column transform matrix using the equation: $W_{NJ} = T_{NN,t} \cdot B_{NN} \cdot R_{NN} \cdot B^*_{NN} \cdot G_{NJ} \cdot T_{JJ,t'}$ As illustrated in FIG. 1, in another embodiment of the present application, a method is provided for obtaining transform matrices for down-sampling a DCT image of size M×N to a down-sampled DCT image of size I×J directly in the DCT domain.

The method of FIG. 1 will permit a row transform matrix $D_{IM}$ and a column transform matrix $W_{NJ}$ to be selected which jointly maximize the visual quality of down-sampled DCT images that are obtained by applying the transform matrices to the DCT images while minimizing the computational complexity of applying the transform matrices to the DCT images to obtain the down-sampled DCT images. That is, a row transform matrix and a column transform matrix are selected which provide a desired trade-off between computational complexity and visual quality. It is typically considered desirable to have a higher quality down-sampled DCT image and a lower computational complexity associated with obtaining that down-sampled DCT image.

At step 102 optimization parameters may be obtained. The optimization parameters permit a user, system administrator, or programmer to have control over the balance between computational complexity and visual quality. For example, the optimization parameters may include a computational complexity trade-off parameter, ρ, which is used to balance the relative importance of various factors on the computational complexity. In some embodiments, the optimization parameters may include a rounding parameter, η, which is used to determine how close a value must be to another value before the algorithm will attempt to round to the other value. The optimization parameters may also include a quality and complexity trade-off parameter λ which is used to adjust the desired trade-off between the visual quality and complexity. That is, the quality and complexity trade-off parameter λ may be used to specify whether optimization of the transform matrices will be more or less focused on visual quality or complexity. The optimization parameters may also include selective learning with forgetting threshold parameters, $w_o$, $d_o$, which will be used in a selective learning with forgetting stage to adjust the threshold above which an element in the transform matrices will be considered protected and not pushed towards zero. In some embodiments, the optimization parameters may include a learning step size parameter, α, which is used to adjust the step size of learning operations.

That is, it is used to adjust how great the degree with which the transform matrices will be adjusted after an iteration of learning.

Depending on the method used to optimize the transform matrices, some or all of the optimization parameters discussed above may be obtained in step 102. In some embodiments, these parameters are stored in a memory and they are retrieved from the memory.

In other embodiments, the optimization parameters may be obtained from a user. A user may be prompted to enter desired optimization parameters using an input device. In some embodiments, a setup module may be run by the user which allows the user to enter optimization parameters. After the user enters the optimization parameters, they may be saved to the memory.

In some embodiments, the optimization parameters are entered on a server which obtains the transform matrices.

Next, at step 104, a training set is obtained which will be used in training the transform matrices. The training set includes at least one DCT reference image, $C_{MN}$, and typically includes a corresponding down-sampled DCT reference image, $V_{IJ}$, for each reference image. The DCT reference image is of the size M×N and the down-sampled DCT reference image is of the size I×J.

As will be described more fully below, the training set will be used to evaluate the quality of down-sampled images obtained using the transform matrices relative to the quality of the down-sampled DCT reference image.

Typically, the training set will consist of more than one DCT reference image $C_{MN}$ and more than one down-sampled DCT reference image, $V_{IJ}$. The down-sampled DCT reference image $V_{IJ}$ is obtained using another down-sampling method. Typically, the down-sampled DCT reference image $V_{IJ}$ is obtained using a spatial domain reference image in which the DCT reference image $C_{MN}$ is converted to the spatial domain using an inverse DCT transform, and the spatial domain image is down-sampled using a spatial domain down-sampling method. Then, the down-sampled spatial domain reference image is transferred back to the DCT domain using a DCT transform to obtain the down-sampled DCT reference image, $V_{IJ}$.

This will permit the transform matrices to be trained multiple times, thus increasing the accuracy of the transform matrices. For example, in some embodiments the training set includes five DCT reference images $C_{MN}$ and five down sampled DCT reference images, $V_{IJ}$, each corresponding to one of the DCT reference images.

The step 104 of obtaining a training set may include a step of applying a pre-selected down sampling method to a DCT reference image to obtain the down-sampled DCT reference images. Typically, the pre-selected down-sampling method is a spatial domain down-sampling method.

Figure 2:
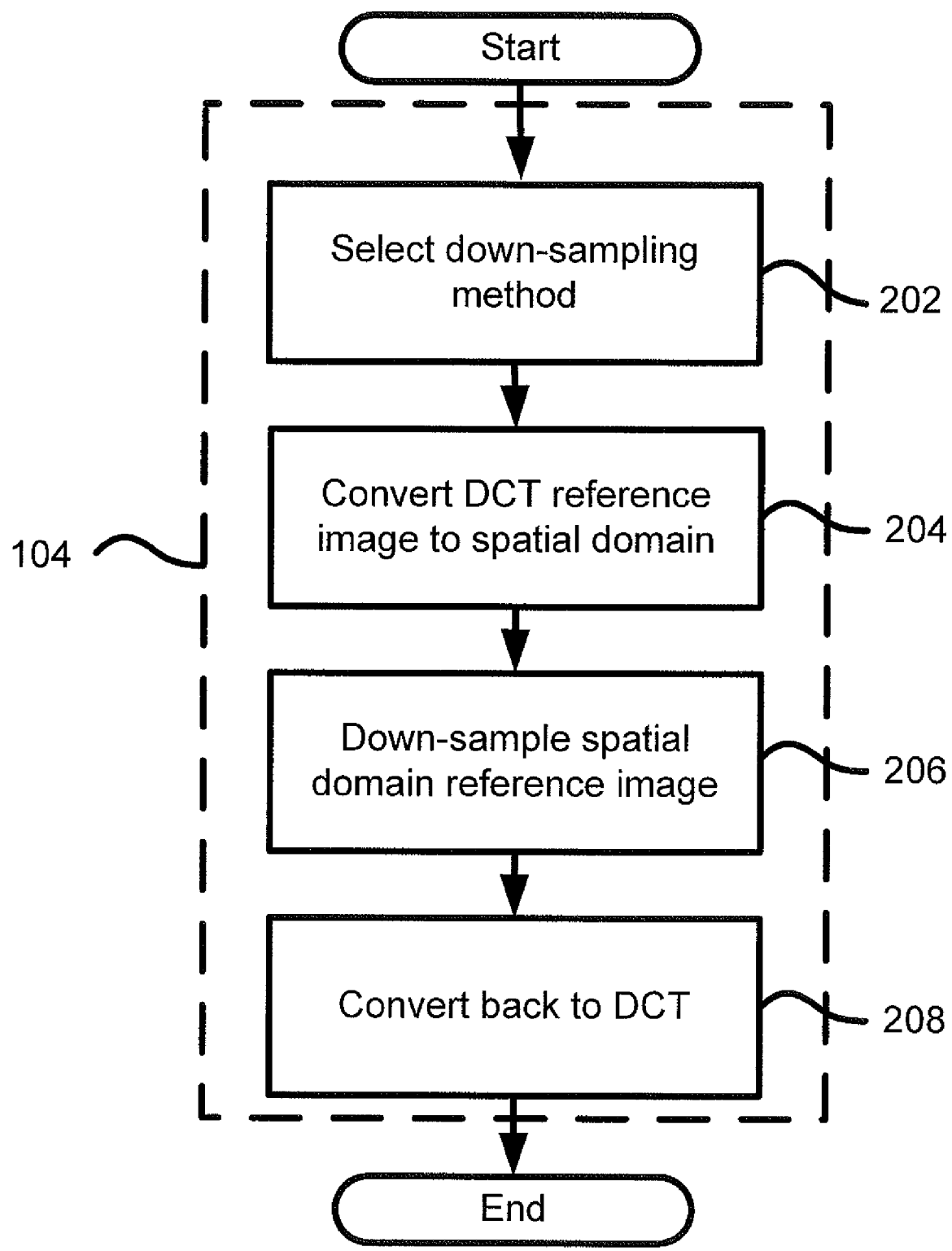
FIG. 2 shows a method of obtaining a training set in accordance with one aspect of the present application.

Referring now to FIG. 2, a method is shown for obtaining a training set using a spatial domain down-sampling method. At step 202 a down-sampling method is selected. Typically, the selected down-sampling method will be a down-sampling method which produces a down-sampled DCT reference image with an optimal visual quality since the visual quality of the down-sampled image produced according to the present method is dependent on the visual quality of the down-sampled DCT reference image.

In some instances, the down-sampling method is predetermined.

Where the down-sampling method is a spatial domain down-sampling method, the method of obtaining the training set includes a step 204 of converting at least one of the DCT reference images to the spatial domain by applying an inverse DCT to produce a spatial domain reference image. Next, at step 206, the spatial domain reference image is down-sampled using the selected spatial domain down-sampling method to produce a spatial domain down-sampled reference image. Then, at step 208, the spatial domain down-sampled reference image is converted back to the DCT domain to obtain the down-sampled DCT reference image.

Typically, the step 206 of down-sampling the converted DCT reference image in the spatial domain includes the steps of: 1) applying a low pass filter to the spatial domain reference image to produce a filtered image; and 2) interpolating within the filtered image to produce the spatial domain down-sampled reference image.

With respect to the step of filtering, a filter is typically selected which provides a good trade-off among three factors: the reduction or elimination of aliasing, the preservation of low-frequency components, and the reduction or elimination of ringing. Generally, a filter with a sharp transition band provides a good performance on anti-aliasing and preserving low-frequency components, yet a sharp transition band incurs ringing along intensity edges in the filtered image.

In some embodiments, a Butterworth filter is used. The Butterworth filter provides a good trade-off among the three factors (aliasing, low-frequency components, and ringing). That is, two one dimensional Butterworth filters may be selected with the frequency response function:

$$|H(f)| = \sqrt{\frac{1}{1+(f/f_c)^{2L}}}$$

where $f_c$ is the cutoff frequency and L represents the order of the filter which characterizes the transition band. In some embodiments, the filter may be a tenth order filter (i.e. L=10).

As noted above, this filter may be applied to the spatial domain reference image to obtain a filtered image.

Following the step of low-pass filtering, interpolation may be performed on the filtered image to obtain the spatial domain down-sampled reference image. Interpolation involves estimating the values of the spatial domain down-sampled reference image at certain points.

A wide range of interpolation methods may be used. For example, nearest neighbour interpolation or spline interpolation may be used. The Nyquist-Shannon interpolation uses a sine function which achieves theoretically optimal performance.

In some embodiments, cubic interpolation may be used which provides a smooth function with a continuous first derivative. While the nearest neighbor interpolation corresponds to a square interpolation function, the bicubic interpolation is obtained by convolving three square functions.

It will be apparent to a person skilled in the art that, while specific spatial domain down-sampling methods have been discussed above, the method discussed herein may be used with any other spatial domain method.

The training set may be stored in a memory after it is created. In some embodiments, the memory may contain a database of training sets for various down-sampling ratio. For example, the database may contain data training sets to train transform matrices to convert a matrix of size M×N to a matrix of any one of a number of various sizes (i.e. I×J, O×P, Q×R, etc. . . . ).

In embodiments where training sets are previously generated and stored in memory, the step 104 of obtaining a training set may merely require the training set to be retrieved from the memory.

Once a training set is obtained, the method of obtaining transform matrices for down-sampling-a DCT image includes a step 106 of selecting transform matrices that minimize an optimization problem. The optimization problem is a function of the error between the down-sampled image obtained by applying the transform matrices to the reference image and the down-sampled DCT reference image. The optimization problem is also a function of the computational complexity of applying the transform matrices.

It will be appreciated that various methods may be employed to find transform matrices which jointly optimize the visual quality and computational complexity. In some embodiments, discussed more fully below, a multi-layer network may be used to find transform matrices which solve the optimization problem.

Accordingly, in step 106, transform matrices are found which obtain a suitable balance between maximizing the quality of the down-sampled image obtained using the matrices, while minimizing the computational complexity associated with down-sampling using the transform matrices. That is, an LTDS is found with the best trade-off between the fidelity of a down-sampled image and the computational complexity of the using the LTDS in the sense of minimizing the joint cost.

In order to select the transform matrices which minimize the joint cost, a value representing the visual quality of the down-sampled DCT images obtained using the transform matrices may be determined. A value representing the computational complexity associated with applying the transform matrices to a DCT image in order to down-sample the DCT image may also be determined. The joint cost of the transform matrices may then be determined as a function of the value representing the visual quality of the down-sampled DCT images obtained using the transform matrices and the computational complexity associated with applying the transform matrices to a DCT image in order to down-sample the DCT image.

The visual quality of the down-sampled image is measured relative to the quality of the down-sampled DCT reference image obtained using the other down-sampling method. Where quality is measured in this manner, the linear transform double sided matrices, $D_{IM}$ and $W_{NJ}$, may be selected to minimize the difference in between the quality of the image obtained using the transform matrices (i.e. $D_{IM} \cdot C_{MN} \cdot W_{NJ}$) and the quality of a down-sampled DCT reference image, $V_{IJ}$, obtained using the other down-sampling method. That is, the transform matrices, $D_{IM}$ and $W_{NJ}$, are selected to satisfy the following optimization problem:

$$\min_{D_{IM}, W_{NJ}} (\|D_{IM} \cdot C_{MN} \cdot W_{NJ} - V_{IJ}\|^2 + \lambda \cdot r_g)$$

where $D_{IM} \cdot C_{MN} \cdot W_{NJ}$ is a down-sampled image obtained using the transform matrices, $V_{IJ}$ is the DCT reference image which represents a down-sampled image obtained using another down-sampling method. $r_g$ is a measure of the computational complexity associated with using the transform matrices $D_{IM}, W_{NJ}$ to down-sample an image $C_{MN}$ and, $\lambda$, is a quality and complexity trade-off parameter.

The quality and complexity trade-off parameter, $\lambda$, may be used to balance the trade-off between the visual quality and computational complexity. That is, the quality complexity trade-off parameter may be used to adjust whether optimization will be more or less focused on visual quality or complexity.

As used in the above equation, the quality and complexity trade-off parameter, $\lambda$, is applied to the computational complexity associated with using the transform matrices. In this case, a greater quality complexity trade-off parameter, $\lambda$, will result in more importance being placed on complexity. Where the quality complexity trade-off parameter, $\lambda$, is applied in this manner, an example of a suitable value may be 0.1. However, it will be appreciated that various values for the quality and complexity trade-off parameter, $\lambda$, may also be used.

Where a quality and complexity trade-off parameter, $\lambda$, is used, the method may further include a step of retrieving the quality and complexity trade-off parameter. This step may be included in the step 102 of obtaining the optimization parameters. The quality complexity trade-off parameter, $\lambda$, may be retrieved from a memory. In other embodiments, the a quality and complexity trade-off parameter, $\lambda$, may be obtained via user input.

The computational complexity may be a function of the absolute values of elements in the row-size transform matrix and the column transform matrix. That is, in some embodiments, the computational complexity may be calculated as: $r_g = |D_{IM}| + |W_{NJ}|$, where $|\cdot|$ defines the $l_1$ norm of a matrix.

The computational complexity may, therefore, be a function of how far the elements of the matrices are from zero. It will be appreciated that the computational complexity of the transform matrices will be minimized when all elements of the transform matrices are zero. Of course, it is undesirable to have transform matrices where all elements are zero since it would not produce a down-sampled image and the quality, would therefore, be undesirable.

To determine how far the elements of the matrices are from zero, the method may include a step of calculating the summation of the absolute values of elements in the transform matrices.

In some embodiments, the complexity model is established to ignore the non-zero effect of matrix elements with values greater than a threshold $w_o$, $d_o$ on computational complexity. For example, the complexity model may be:

$$r_g = |D_{IM}|_{|d_{im}|<d_o} + |W_{NJ}|_{|w_{nj}|<w_o}$$

That is, the method may comprise a step of calculating the summation of the absolute value of all elements in the row transform matrix and the column size matrix that are below two thresholds $w_o$, $d_o$. In many cases, the thresholds may be the same (i.e. $w_o = d_o$).

Besides the number of non-zero elements in the row transform matrix and the column transform matrix, the complexity for computing a down-sampled DCT image using the transform matrices is also related to how multiplications may be implemented. In general, a multiplication may be approximated by a series of additions and shifts.

In some embodiments, the computational complexity may be related to the number of non-zero elements in the binary representation of the number. That is, it is considered more desirable to have a zero in a binary representation than a one. Accordingly, the computational complexity may evaluate the number of non-zero elements in the binary representation of each of the row transform matrix and the column transform matrix. This may be done by locating a computationally more desirable value within the neighborhood of a current element of the transform matrix. The computational complexity of the value may be a function of the difference between the current element of the transform matrix and the computationally more desirable value.

More particularly, for any element, b, in one of the transform matrices, a set of binary digits, $\{a_i\}$, may be found which satisfies the equation:

$$\{a_i\} = \arg \min_{|b-\sum(a_i 2^{-i})| \le |b|n} \sum |a_i|$$

where n is a rounding parameter, which is used to adjust how large the neighborhood of an element, b, may be. That is, n is used to adjust how close the element, b, must be to another value having more zeros in its binary representation before the other value will be considered desirable. The binary representation may be converted back into a decimal number system representation to obtain a quantized decimal value. The procedure of locating a neighboring value which is less complex than the current element, b, may be referred to as a quantization procedure, Q(b).

In some embodiments, a binary number system is used in which every binary digit may be signed. That is, the binary digits may be an element of the set consisting of positive one (1), zero (0), or minus one (−1). (i.e. $a_i \in \{1,-1,0\}$). In some embodiments, such a binary representation may be used since it permits binary representations with a maximum number of zeros (0). For example, if we consider the binary representation of the number 0.46875 in a binary system in which each element must be selected from the set consisting of only one (1) and zero (0), the binary representation would be 0.01111. That is, $0.46875=(0\times 2^0)+(0\times 2^{-1})+(1\times 2^{-2})+(1\times 2^{-3})+(1\times 2^{-4})+(1\times 2^{-5})$ Using this number system, four ones are needed to represent the number. In contrast, the same number could be represented using the signed system mentioned above using only two ones: $0.46875=(0\times 2^0)+(1\times 2^{-1})+(0\times 2^{-2})+(0\times 2^{-3})+(0\times 2^{-4})+((-1)\times 2^{-5})$.

Typically, the magnitude of all elements in the transform matrices $D_{IM}, W_{NJ}$ is in the range [0, 8). That is, the magnitudes of all elements is greater than or equal to 0 and less than 8. If this assumption is made, then the integer portion of the elements may be represented with three binary digits (i.e. $2^2$, $2^1$, $2^0$). The number of binary digits used to represent the decimal fraction portion of the elements may depend on the desired visual quality of down-sampled DCT images obtained using the matrices. For example, if fewer binary digits are used to represent the decimal fraction portion of the elements, the computational complexity associated with using the transform matrices will be reduced, but the visual quality of the down-sampled DCT images may also be reduced. In some embodiments, fifteen (15) binary digits are allocated for representing the decimal fraction portion of the elements of the transform matrices.

If the binary system discussed above is used, the quantization procedure for an element, b, may be represented as:

$$Q(b) = \sum_{i=-2}^{i=15} a_i \cdot 2^{-i}, a_i \in \{1,-1,0\}, \text{ where } \{a_i\} = \arg \min_{|b-\sum(a_i 2^{-i})| \le |b|n} \sum |a_i|$$

That is, the quantization procedure referred to above determines a set of binary numbers, $\{a_i\}$ for a computationally more desirable value. Then the decimal representation of the computationally more desirable value is determined.

The difference between the current element, b, of the transform matrix and the computationally more desirable value may then be found. For example, the computational complexity associated with the number of non-zero elements in the binary representation of the elements of the transform matrices may be determined as:

$$r_q = |D_{IM} - Q(D_{IM})| + |W_{NJ} - Q(W_{NJ})|$$

where $Q(D_{IM})$, $Q(W_{NJ})$ mean to apply a quantization procedure to each element of the row transform matrix and the column transform matrix respectively.

Since the computational complexity is a function of both the number of non-zero decimal representations in the transform matrices and the number of non-zero elements in the binary representation of the elements of the transform matrices, the computational complexity may determined as:

$$r_q = (|D_{IM}|_{|d_{im}|<do} + |W_{NJ}|_{|w_{nj}|<wo}) + \rho \cdot (|D_{IM} - Q(D_{IM})| + |W_{NJ} - Q(W_{NJ})|)$$

where $\rho$ is a computational complexity tradeoff parameter used to balance the relative importance on the computational complexity of the number of non-zero elements in the transform matrices and the difference between current weights in the transform matrix and weights that are close to the current weights but which would have more zeros in their binary representation. In some embodiments, $\rho$ is equal to 0.5.

Figure 3:
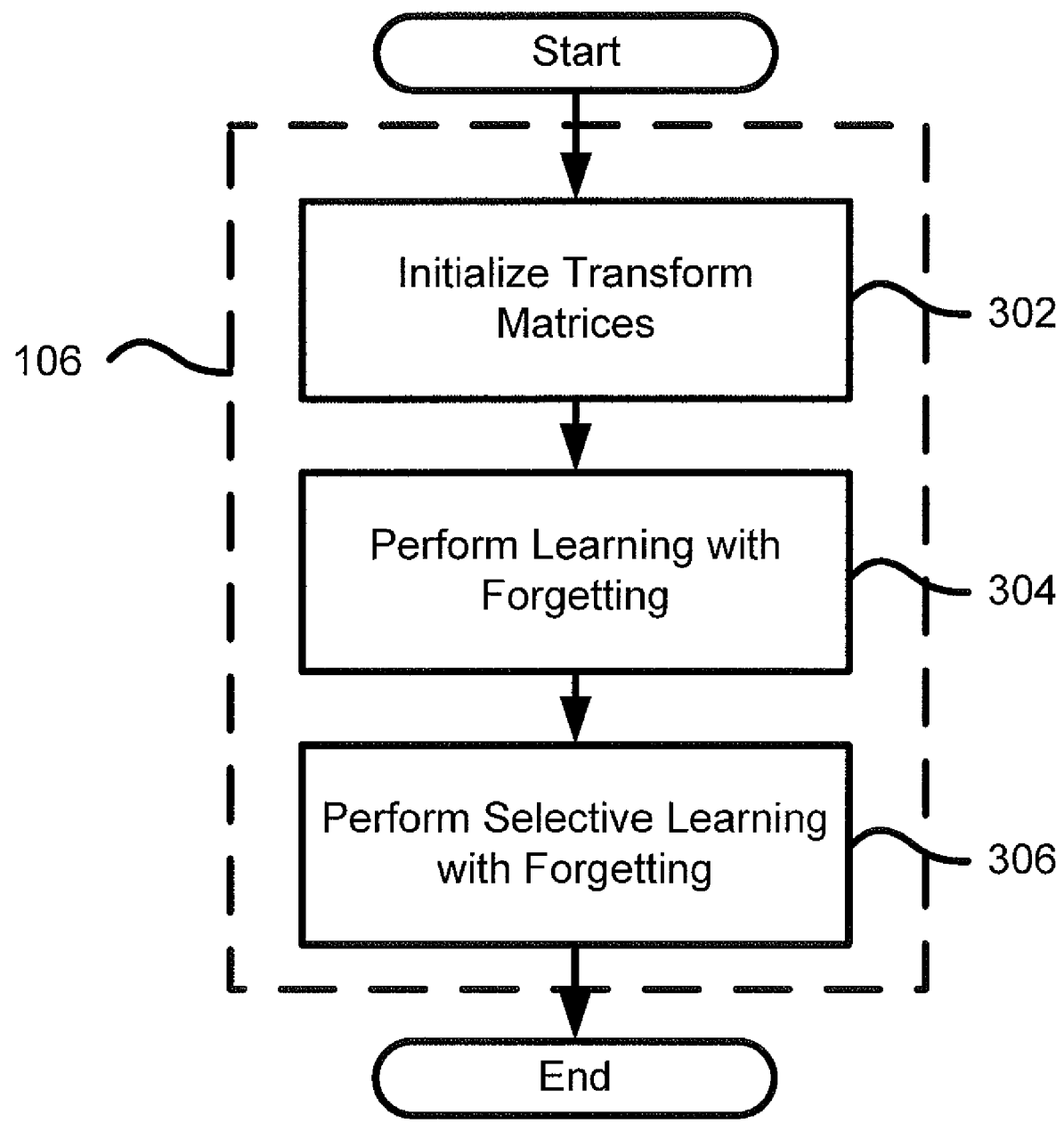
FIG. 3 shows a method of selecting transform matrices in accordance with one aspect of the present application.

Referring now to FIG. 3, a method of obtaining transform matrices according to one aspect of the present application is shown. In this embodiment, a multiple-layer network is used to find transform matrices which minimize the joint cost of the transform matrices. That is, a multiple-layer network is used to find transform matrices which offer a desired balance between computational complexity and visual quality.

Figure 4B:
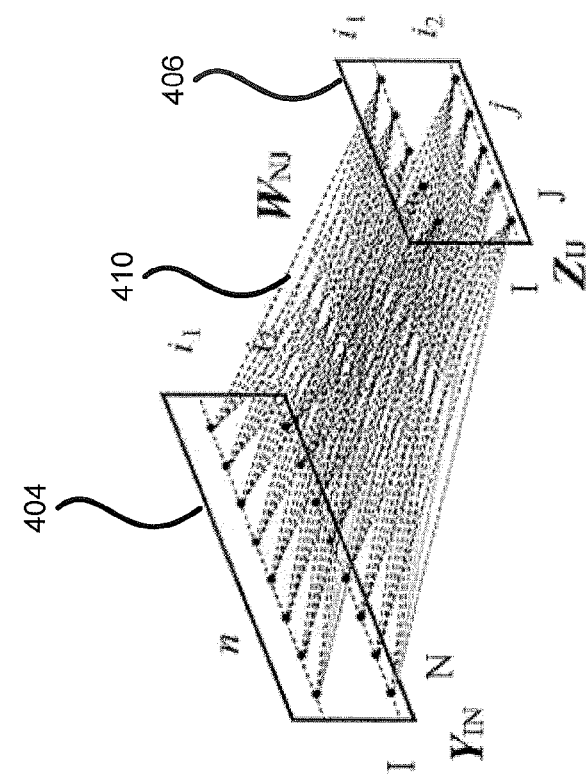
FIGS. 4A and 4B show a three layer network representation of the transform matrices.
Figure 4A:
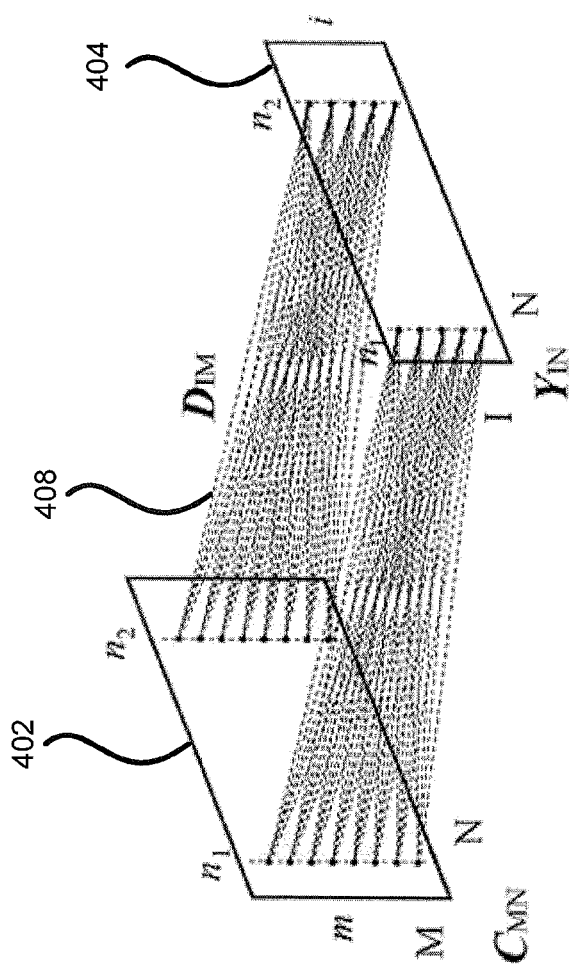

At step 302, transform matrices are initialized. Referring to FIGS. 4A and 4B a multiple-layer network representation of the transform matrices is shown. A three layer network structure is used, in which there is an input layer 402, representing an input image $C_{MN}$ of size M×N. There is also a hidden layer 404, representing an intermediary matrix $Y_{IN}$ of size I×N. The multiple-layer network structure also contains an output layer 406, representing a down-sampled image $Z_{IJ}$ of size I×J. Connections 408, 410 are selectively built up among units in each two layers to simulate the matrix multiplication operation, in the linear transform. That is, connections 408 between the input layer 402 and the hidden layer 404 represent the application of the row transform matrix $D_{IM}$ to the input image $C_{MN}$. Similarly, connections 410 between the hidden layer 404 and the output layer 406 represent the application of the column transform matrix $W_{NJ}$ to the intermediary matrix $Y_{IN}$.

Connections between the layers are established according to a number of rules. With respect to the connections 408 between the input layer and the hidden layer, connections are established from units in a given column (i.e. $n_1$) of the input layer to units of the same column (i.e. $n_1$) in the hidden layer. That is, the input layer and the hidden layer have the same number of columns. Units in a given column of the input layer are fully connected to units in the same column of the hidden layer. Valid connections between any of two columns of the input layer and the hidden layer share the same weight matrix i.e. $D_{IM}$.

Similarly, connections 410 between the hidden layer 404 and the output layer 406 are built up among rows. Connections are established from units in a given column (i.e. $i_1$) of the hidden layer 404 to units in the same column of the output layer 406 (i.e. $i_1$). Valid connections 410 between any two rows of the hidden layer and the output layer share the same weight matrix i.e. $W_{NJ}$.

Accordingly, the output of the hidden layer 404 is computed as $Y_{IN} = D_{IM} \cdot C_{MN}$ and the output of the output layer 406 is computed as $Z_{IJ} = Y_{IN} \cdot W_{NJ} = D_{IM} \cdot C_{MN} \cdot W_{NJ}$.

Referring again to FIG. 3, during the step of initialization, an initial starting weight may be placed in the elements of the transform matrices $D_{IM}$, $W_{NJ}$. The initial starting weight represents a starting point from which a decay procedure will be applied. In some embodiments, random weights may be placed in the elements of the transform matrices $D_{IM}$, $W_{NJ}$.

At step 304, a learning with forgetting algorithm is applied to the transform matrices to obtain transform matrices with a reduced learning objective function. This stage is used to find a skeleton structure of the transform matrices.

It will be appreciated that due to a random initialization of the connection weights, some redundant connections may possess an initial weight with a large value. Accordingly, the learning with forgetting stage will apply a constant decay to all elements in order to remove redundant connections which are present due to a random initialization of the weights. Such redundant connections are removed as much as possible. This approach leads to a constant decay for all non-zero elements, forcing as many elements to be zero as possible.

The learning objective function at this stage is:

$$J_f = \|D_{IM} C_{MN} W_{NJ} - V_{IJ}\|^2 + \lambda \cdot r_g$$

where $J_f$ is the learning objective function, $D_{IM}$ is the row transform matrix, $W_{NJ}$ is the column transform matrix, $C_{MN}$ is the DCT image, $D_{IM} \cdot C_{MN} \cdot W_{NJ}$ is the down-sampled DCT image obtained using the transform matrices, $V_{IJ}$ is a down-sampled DCT reference image obtained using another down-sampling method, $r_g$ is the computational complexity associated with using the transform matrices $D_{IM}$, $W_{NJ}$ to down-sample an image $C_{MN}$ and $\lambda$ is a quality and complexity trade-off parameter used to balance a trade-off between visual quality of down-sampled DCT images and the computational complexity of obtaining the down-sampled DCT images. In this case, the computational complexity is a function of the absolute value of all elements of the transform matrices. That is, $r_g = r_f = |D_{IM}| + |W_{NJ}|$, where $|\cdot|$ defines the $l_1$ norm of a matrix.

Since the complexity for this stage is a function of the absolute value of all elements in the matrices, the complexity is minimized if every element is zero.

It will also be noted that the visual quality at this stage is measured as the mean square error of the visual quality of the down-sampled DCT image produced using the transform matrices and the visual quality of the down-sampled DCT image produced by applying another down-sampling method to the same initial image.

Figure 5:
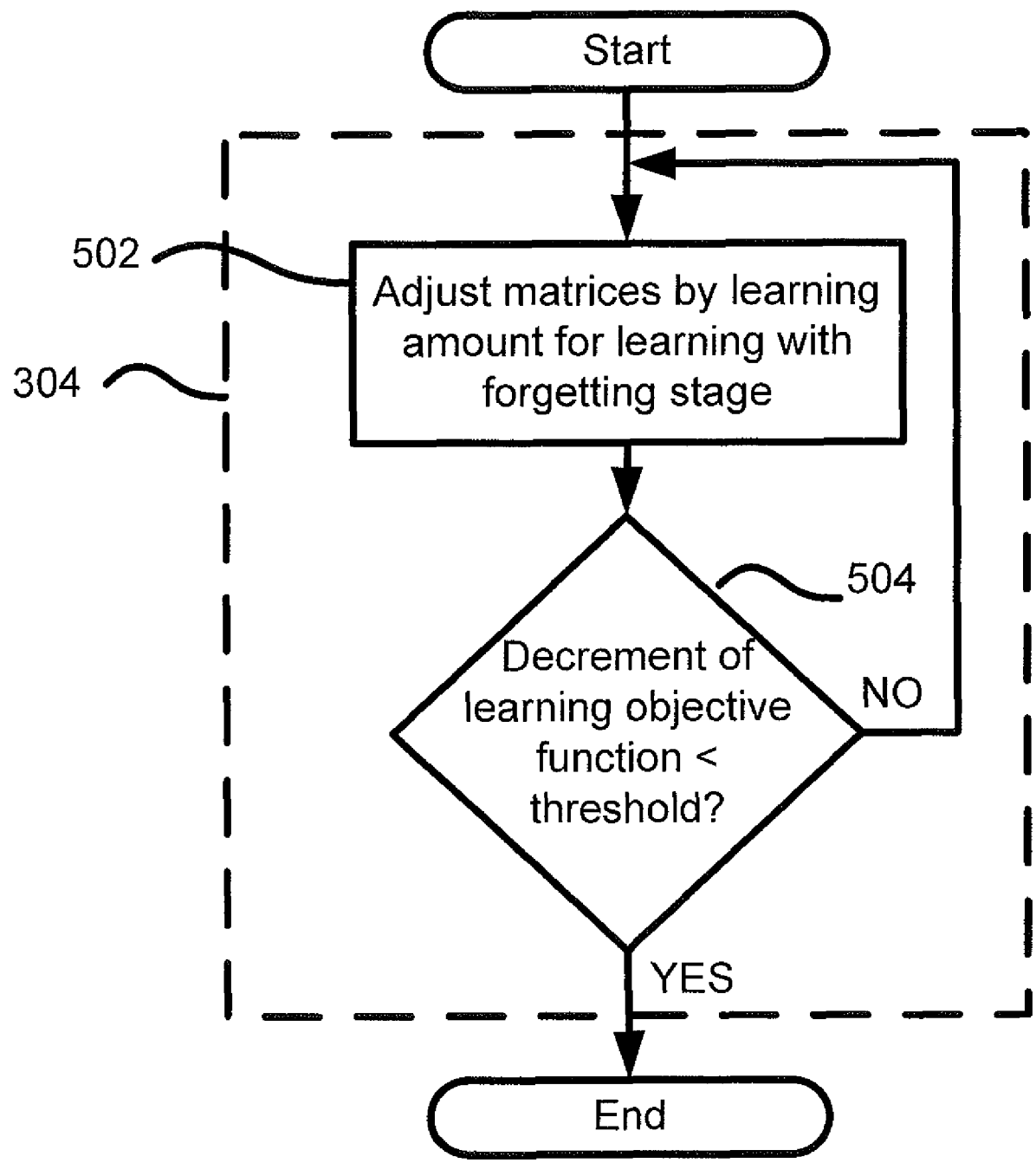
FIG. 5 shows a method of training transform matrices using a learning with forgetting algorithm.

As illustrated in FIG. 5, the learning with forgetting algorithm includes a step of adjusting matrices by a learning amount. The learning amount may be calculated by using a back propagation algorithm.

First, the input signal is passed forward to compute network outputs:

$$Y_{IN} = D_{IM} \cdot C_{MN} \Rightarrow Z_{IJ} = Y_{IN} \cdot W_{NJ}$$

A network error is then determined by comparing the network output to the output for the down-sampled DCT reference image, which was produced using another down-sampling domain method. The network error is then propagated backward.

$$\Delta Z_{IJ} = Z_{IJ} - V_{IJ} \Rightarrow (\Delta Y)_{IN} = (\Delta Z)_{IJ} \cdot (W^t)_{JN}$$

The learning amounts may then be determined for each of the transform matrices. The learning amounts may be determined as:

$$\Delta D = \frac{1}{2} \cdot \frac{\partial J_f}{\partial D} = (\Delta Y)_{IN} \cdot (C^t)_{NM} + \lambda \cdot \text{sgn}(D_{IM})$$

$$\Delta W = \frac{1}{2} \cdot \frac{\partial J_f}{\partial W} = (Y^t)_{NI} \cdot (\Delta Z)_{IJ} + \lambda \cdot \text{sgn}(W_{NJ})$$

where sgn(x) is the sign function as:

$$\text{sgn}(x) = \begin{cases} \frac{1}{2}, & x > 0 \\ 0, & x = 0 \\ -\frac{1}{2}, & x < 0 \end{cases}$$

The learning amounts may then be applied to the transform matrices to obtain adjusted transform matrices:

$$D_{IM}^{(n+1)} = D_{IM}^{(n)} - \alpha \cdot \Delta D$$

$$W_{NJ}^{(n+1)} = W_{NJ}^{(n)} - \alpha \cdot \Delta W$$

where the superscripts (n) and (n+1) accord to the nth and (n+1)th iterations and $\alpha$ is a small positive number named the learning factor or learning step size parameter. The learning factor is used to adjust the step size of learning operations. That is, it is used to adjust how great the adjustment will be with each iteration of learning. In some embodiments, the learning factor is $1 \times 10^{-6}$.

Typically, there will be multiple learning with forgetting iterations. In one embodiment, at step 504, a determination is made regarding whether the decrement of the learning objective function was less than a predetermined threshold. If it was not, another iteration of learning with forgetting will be performed. If it was less than the predetermined threshold, then the learning with forgetting stage will be considered to be completed. That is, the learning with forgetting stage is complete when each iteration of learning no longer yields a sufficient improvement to the transform matrices in terms of minimizing the joint cost.

In some embodiments, the predetermined threshold is zero. That is, the learning objective function will be completed when the joint cost of the transform matrices is no longer improving with each iteration.

Learning with forgetting normally ends with a skeleton structure but a large distortion of $\|D \cdot C \cdot W - V\|^2$. That is, a constant decay to elements with large values will introduce a large distortion to the visual quality, measured as $\|x_{ij} - T^{-1}(D_{IM} \cdot C_{MN} \cdot W_{NJ})\|^2$, where $x_{ij}$ is a spatial domain down-sampled image and $T^{-1}(x)$ is an inverse DCT transform.

As illustrated in FIG. 3, a step 306 of performing a selective learning with forgetting algorithm may then be used to tune the structure for better trade-off between the distortion of $\|D \cdot C \cdot W - V\|^2$ and the complexity. The selective learning with forgetting stage protects certain large elements from decay so that they can be trained to focus on providing better visual quality.

Since the selective learning with forgetting stage protects certain large elements from decay, the complexity model may include at least one selective learning with forgetting threshold parameter ($w_o$ or $d_o$) to be used for determining what is or is not considered a large element. In some embodiments, each of the transform matrices has its own selective learning with forgetting threshold parameter ($w_o$ or $d_o$). In other embodiments, the selective learning with forgetting threshold parameter ($w_o$ or $d_o$) is the same for both transform matrices.

The selective learning with forgetting threshold parameter ($w_o$ or $d_o$) has the effect of adjusting the trade-off between visual quality and complexity since a higher threshold may result in a higher quality image, but will result in less elements of the transform matrices which have been pushed toward zero. In some embodiments, the selective learning with forgetting threshold parameter ($w_o$ or $d_o$) is 0.1.

The learning objective function at this stage is very similar to the learning objective at the learning with forgetting stage:

$$J_f = \|D_{IM} C_{MN} W_{NJ} - V_{IJ}\|^2 + \lambda \cdot r_g$$

where $J_f$ is the learning objective function, $D_{IM}$ is the row transform matrix, $W_{NJ}$ is the column transform matrix, $C_{MN}$ is the DCT image, $D_{IM} \cdot C_{MN} \cdot W_{NJ}$ is the down-sampled DCT image obtained using the transform matrices, $V_{IJ}$ is a down-sampled DCT reference image obtained using another down-sampling method, $r_g$ is selective learning with forgetting computational complexity associated with using the transform matrices $D_{IM}, W_{NJ}$ to down-sample an image $C_{MN}$ and $\lambda$ is a quality and complexity trade-off parameter used to balance a trade-off between visual quality of down-sampled DCT images and the computational complexity of obtaining the down-sampled DCT images.

In this case, however, the complexity model is established to ignore the non-zero effect of matrix elements with values greater than the threshold on the complexity. For example, the complexity model for the learning with forgetting stage may be:

$$r_g = r_q = |D_{IM}|_{|d_{im}|<d_o} + |W_{NJ}|_{|w_{nj}|<w_o}$$

That is, the method may comprise a step of calculating the summation of the absolute value of all elements in the row transform matrix and the column size matrix that are below two thresholds $w_o$, $d_o$. In many cases, the thresholds may be the same (i.e. $w_o = d_o$).

As discussed previously, besides the number of non-zero elements in the row transform matrix and the column transform matrix, the complexity for computing a down-sampled DCT image using the transform matrices is also related to how multiplications may be implemented. The computational complexity may be related to the number of non-zero elements in the binary representation of the number. That is, it is considered more desirable to have a zero in a binary representation than a one. Accordingly, the computational complexity may evaluate the number of non-zero elements in the binary representation of each of the row transform matrix and the column transform matrix using the algorithm discussed above. This may be done by locating a computationally more desirable value within the neighborhood of a current element of the transform matrix. The computational complexity of the value may be a function of the difference between the current element of the transform matrix and the computationally more desirable value.

More particularly, for any element, b, in one of the transform matrices, a set of binary digits, $\{a_i\}$, may be found which satisfies the equation:

$$\{a_i\} = \arg \min_{|b - \sum (a_i 2^{-i})| \leq |b|n} \sum |a_i|$$

where n is a rounding parameter, which is used to adjust how large the neighborhood of an element, b, may be. That is, n is used to adjust how close the element, b, must be to another value having more zeros in its binary representation before the other value will be considered desirable. The binary representation may be converted back into a decimal number system representation to obtain a quantized decimal value.

The procedure of locating a neighboring value which is less complex than the current element, b, may be referred to as a quantization procedure, Q(b).

If the binary system discussed above is used, the quantization procedure for an element, b, may be represented as:

$$Q(b) = \sum_{i=-2}^{i=15} a_i \cdot 2^{-i}, \; a_i \in \{1, -1, 0\}, \text{ where } \{a_i\} = \arg \min_{|b - \sum(a_i 2^{-i})| \leq |b|n} \sum |a_i|$$

That is, the quantization procedure referred to above determines a set of binary numbers, $\{a_i\}$ for a computationally more desirable value that is within the neighborhood of the element, b. Then the decimal representation of the computationally more desirable value is determined.

The difference between the current element, b, of the transform matrix and the computationally more desirable value may then be found. For example, the computational complexity associated with the number of non-zero elements in the binary representation of the elements of the transform matrices may be determined as:

$$r_q = |D_{IM} - Q(D_{IM})| + |W_{NJ} - Q(W_{NJ})|$$

where $Q(D_{IM})$, $Q(W_{NJ})$ mean to apply, a quantization procedure to each element of the row transform matrix and the column transform matrix respectively.

Since the computational complexity is a function of both the number of non-zero decimal representations in the transform matrices and the number of non-zero elements in the binary representation of the elements of the transform matrices, the computational complexity in the selective learning with forgetting algorithm may determined as:

$$r_q = (|D_{IM}|_{|d_{im}|<d_o} + |W_{NJ}|_{|w_{nj}|<w_o}) + \rho \cdot (|D_{IM} - Q(D_{IM})| + |W_{NJ} - Q(W_{NJ})|)$$

where $\rho$ is a computational complexity tradeoff parameter used to balance the relative importance on the computational complexity of the number of non-zero elements in the transform matrices and the difference between current weights in the transform matrix and weights that are close to the current weights but which would have more zeros in their binary representation. In some embodiments, $\rho$ is equal to 0.5.

The quantization procedure discussed above, which examines whether there is a neighboring value which is computationally less complex, is generally applied at the selective learning with forgetting stage because its corresponding contribution to the complexity function is at a level similar to $r_q = |D_{IM}|_{|d_{im}|<d_o} + |W_{NJ}|_{|w_{nj}| 21 \; w_o}$ which is much less than $r_f = |D_{IM}| + |W_{NJ}|$.

Note, however, that regardless of which stage the quantization procedure is applied at, the computational complexity tradeoff parameter $\rho$ may be used to balance the relative importance on the computational complexity of the number of non-zero elements in the transform matrices and the difference between current weights in the transform matrix and weights that are close to the current weights but which would have more zeros in their binary representation.

Figure 6:
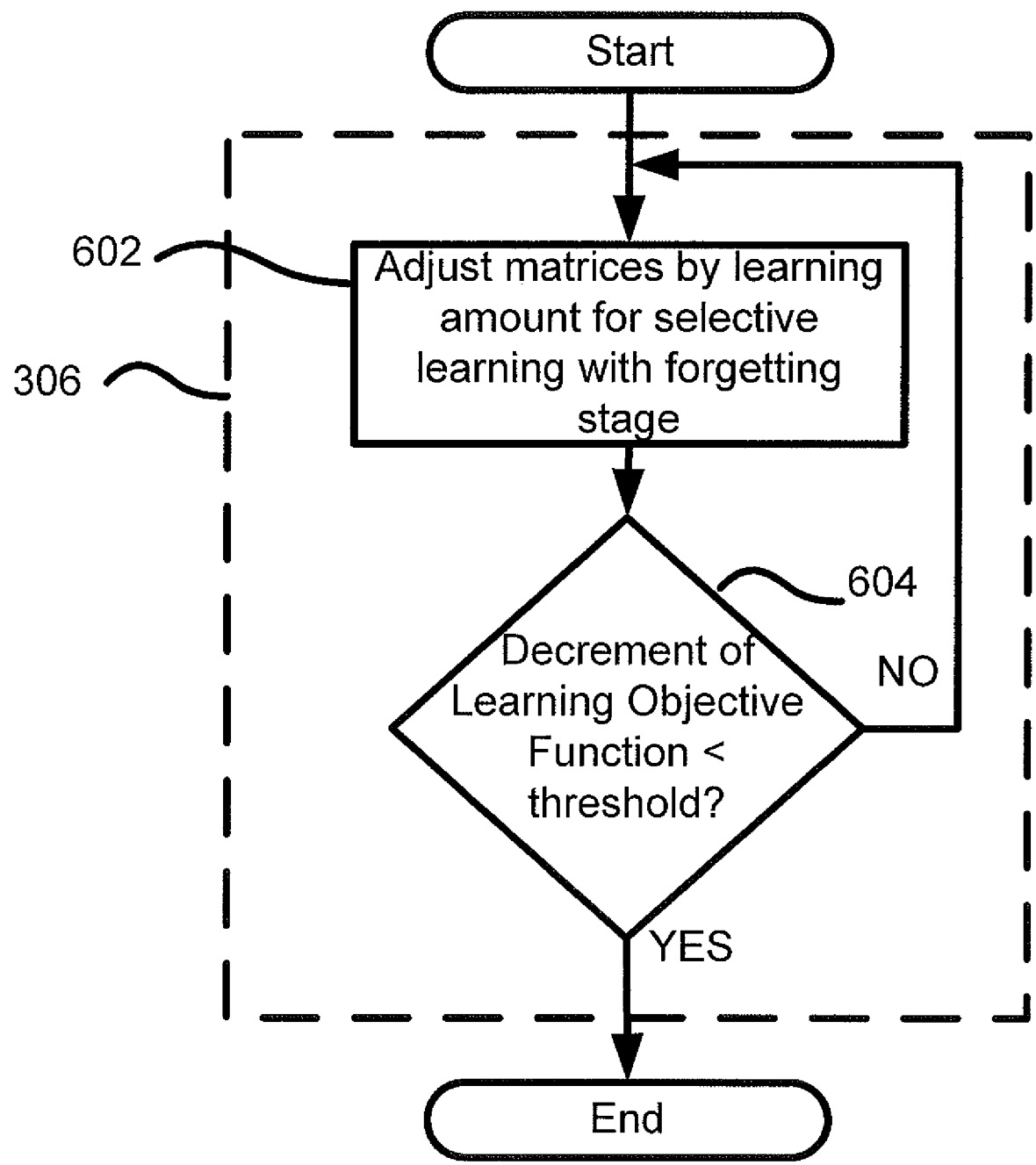
FIG. 6 shows a method of training transform matrices using a selective learning with forgetting algorithm.

Referring now to FIG. 6, a method of applying a selective learning with forgetting algorithm to the transform matrices is shown. At step 602, the transform matrices are adjusted by a learning amount.

The learning amount is determined in much the same way as the learning amount is determined for the learning with forgetting stage.

First, the input signal is passed forward to compute network outputs:

$$Y_{IN} = D_{IM} \cdot C_{MN} \Rightarrow Z_{IJ} = Y_{IN} \cdot W_{NJ}$$

A network error is then determined by comparing the network output to the output for the down-sampled DCT reference image, which was produced using another down-sampling domain method. The network error is then propagated backward.

$$\Delta Z_{IJ} = Z_{IJ} - V_{IJ} \Rightarrow (\Delta Y)_{IN} = (\Delta Z)_{IJ} \cdot (W^t)_{JN}$$

The learning amounts may then be determined for each of the transform matrices. The formula for determining the learning amounts in the selective learning with forgetting stage differs from the formula for determining the learning amounts for the learning with forgetting stage. In the selective learning with forgetting stage, the learning amounts may be determined as:

$$\Delta D = (\Delta Y)_{IN} \cdot (C^t)_{NM} + \lambda \cdot thr(D_{IM}, d_o) + \lambda \cdot \rho \cdot \text{sgn}(D_{IM} - Q(D_{IM}))$$

$$\Delta W = (Y^t)_{NI} \cdot (\Delta Z)_{IJ} + \lambda \cdot thr(W_{NJ}, w_o) + \lambda \cdot \rho \cdot \text{sgn}(W_{NJ} - Q(W_{NJ}))$$

where:

$$thr(x, \theta) = \begin{cases} \frac{1}{2}, & \theta > x > 0 \\ 0, & x = 0; x \geq \theta; x \leq -\theta \\ -\frac{1}{2}, & -\theta < x < 0 \end{cases}$$

$$\text{sgn}(x) = \begin{cases} \frac{1}{2}, & x > 0 \\ 0, & x = 0 \\ -\frac{1}{2}, & x < 0 \end{cases}$$

and $\lambda$ is the quality and complexity trade-off parameter and $\rho$ is the computational complexity tradeoff parameter.

As before with the learning with forgetting algorithm, the learning amounts may then be applied to the transform matrices to obtain adjusted transform matrices:

$$D_{IM}^{(n+1)} = D_{IM}^{(n)} - \alpha \cdot \Delta D$$

$$W_{NJ}^{(n+1)} = W_{NJ}^{(n)} - \alpha \cdot \Delta W$$

where the superscripts (n) and (n+1) accord to the nth and (n+1)th iterations and $\alpha$ is a small positive number named the learning factor or learning step size parameter. As before, the learning factor is used to adjust the step size of learning operations; The learning factor for the selective learning with forgetting stage may be a different value than the learning factor for the learning with forgetting stage.

Typically, there will be multiple selective learning with forgetting iterations. In one embodiment, at step 604, a determination is made regarding whether the decrement of the learning objective function was less than a predetermined threshold. If it was not, another iteration of learning with forgetting will be performed. If it was less than the predetermined threshold, then the selective learning with forgetting stage will be considered to be completed. That is, the selective learning with forgetting stage is complete when each iteration of learning no longer yields a sufficient improvement to the transform matrices in terms of minimizing the joint cost.

In some embodiments, the predetermined threshold, is zero. That is, the learning objective function will be completed when the joint cost of the transform matrices is no longer improving with each iteration.

Following the selective learning with forgetting algorithm, in some embodiments the computational complexity of the transform matrices may be further reduced by combining arithmetic operations.

Figure 7:
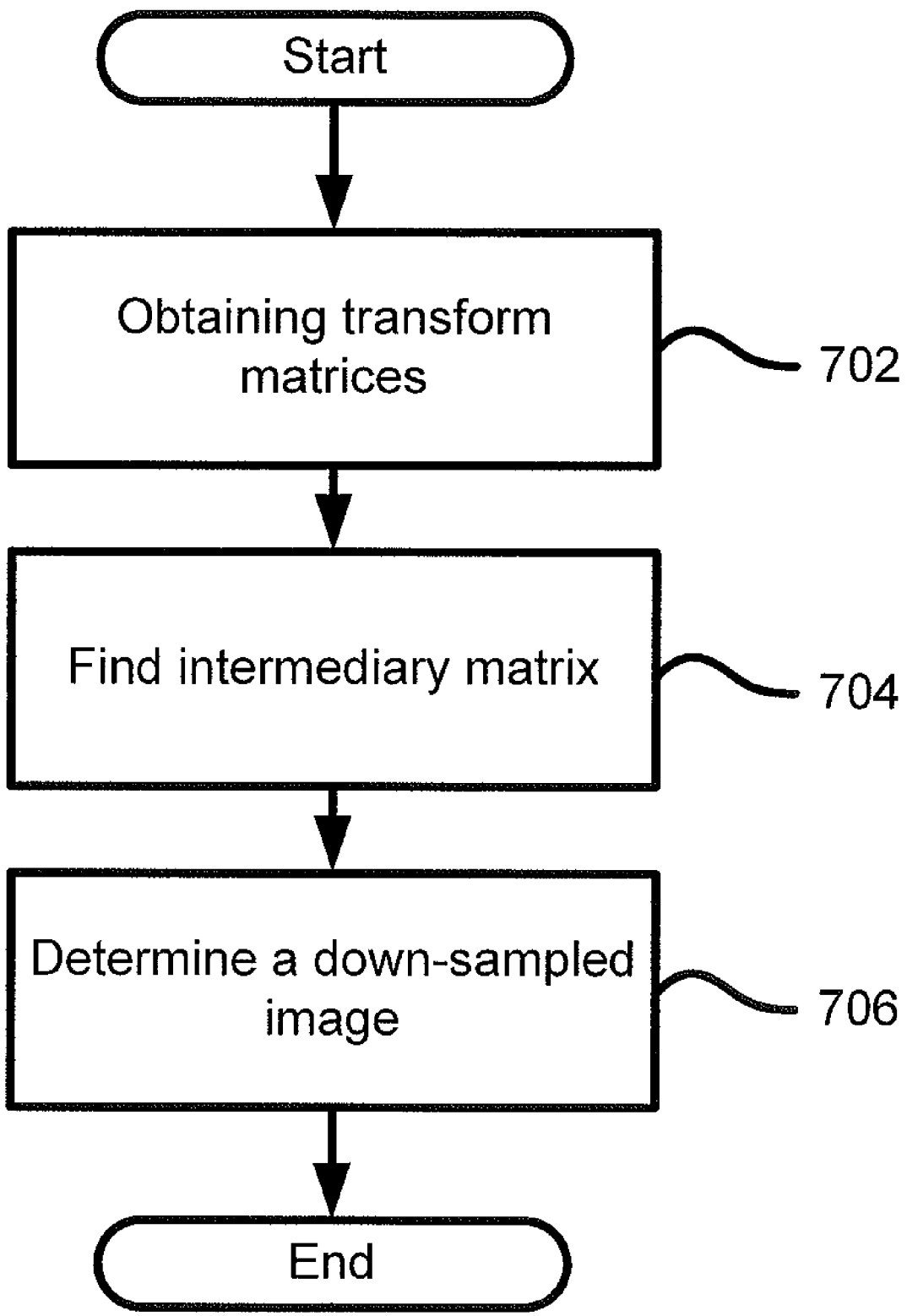
FIG. 7 shows a method of obtaining a down-sampled DCT image in accordance with one aspect of the present application.

Referring now to FIG. 7, according to one aspect of this application, a method is provided for down-sampling a DCT image of size M×N in the DCT domain to produce a down-sampled image of size I×J.

In step 702, transform matrices are obtained. The transform matrices include a row transform matrix of size I×M and a column transform matrix of size N×J. The transform matrices may have been produced according to any of the methods of producing transform matrices for down-sampling a DCT image directly in the DCT domain outlined above. That is, the row transform matrix and the column transform matrix are matrices that have been selected to jointly optimize the visual quality of down-sampled DCT images obtained using the matrices and minimize the computational complexity associated with applying the matrices to DCT images. The visual quality of the down-sampled images is determined with reference to the visual quality of another down-sampled image obtained using another down-sampling method. In some embodiments, the matrices have been determined using a multiple-layer network to solve an optimization problem.

In some embodiments, the step 702 of obtaining includes looking up the row transform matrix and the column transform matrix in a memory. In other embodiments, the step 702 of obtaining includes looking up appropriate transform matrices in a database of transform matrices. In such embodiments, the database may include transform matrices for various down-sampling ratios and the step of obtaining includes selecting the transform matrices with a desired down-sampling characteristic, such as a desired down-sampling ratio.

In some embodiments, the database may be stored remotely on a server. The step of obtaining includes a step of requesting appropriate transform matrices from the server and receiving the row transform matrix and column transform matrix from the server. To ensure that the correct transform matrices are obtained, the step of requesting may include transmitting system identification data to the server. For example, the identification data may include data identifying a display resolution of a device which will be used to display the down-sampled image and/or data identifying processor speed information of a processor which will be used to transform the DCT image into the down-sampled DCT image.

In this way, transform matrices may be received which are best suited for the device's display or processing capabilities.

Following the step of obtaining, a step 704 of determining an intermediary matrix as the product of the DCT image and one of either the row transform matrix or the column transform matrix. Since matrix multiplication is not commutative, the arrangement of multiplication may be important. The row-transform matrix, $D_{IM}$, is generally to the left of the DCT image, $C_{MN}$, in the transformation formula and the column-transform image, $W_{NJ}$, is generally to the right of the DCT image in the transformation formula.

That is, since $D_{IM} \cdot C_{MN} \cdot W_{NJ} \neq W_{NJ} \cdot C_{MN} \cdot D_{IM}$, the latter expression is not used. However, since matrix multiplication is associative, the order may be modified to some extent. The row size matrix may be multiplied with the DCT image and the result multiplied with the column transform matrix (i.e. $(D_{IM} \cdot C_{MN}) \cdot W_{NJ}$), or alternatively the DCT image may be multiplied with the column transform matrix and the result multiplied with the row transform matrix (i.e. $D_{IM} \cdot (C_{MN} \cdot W_{NJ})$).

Accordingly, in step 704 an intermediary matrix, K, is obtained as the product of the DCT image and one of either the row transform matrix or the column transform matrix is obtained as either: $K=(D_{IM} \cdot C_{MN})$ or $K=(C_{MN} \cdot W_{NJ})$ Next, at step 706, the down-sampled DCT image is obtained as the product of the intermediary matrix K and the transform matrix that is not used in the previous step of determining (either $D_{IM}$ or $W_{NJ}$). For example, if the intermediary matrix K is determined as $K=(D_{IM} \cdot C_{MN})$, then the down-sampled DCT image is obtained as $X_{IJ}=(K \cdot W_{NJ})$. Alternatively, if the intermediary matrix K is determined as $K=(C_{MN} \cdot W_{NJ})$, then the down-sampled DCT image is obtained as $X_{IJ}=(D_{IM} \cdot K)$.

It will be appreciated that transcoders for down-sampling images are used in wide variety of electrical devices. Accordingly, the methods described above may be implemented on any suitable electronic device comprised of a processor and a memory.

Figure 8:
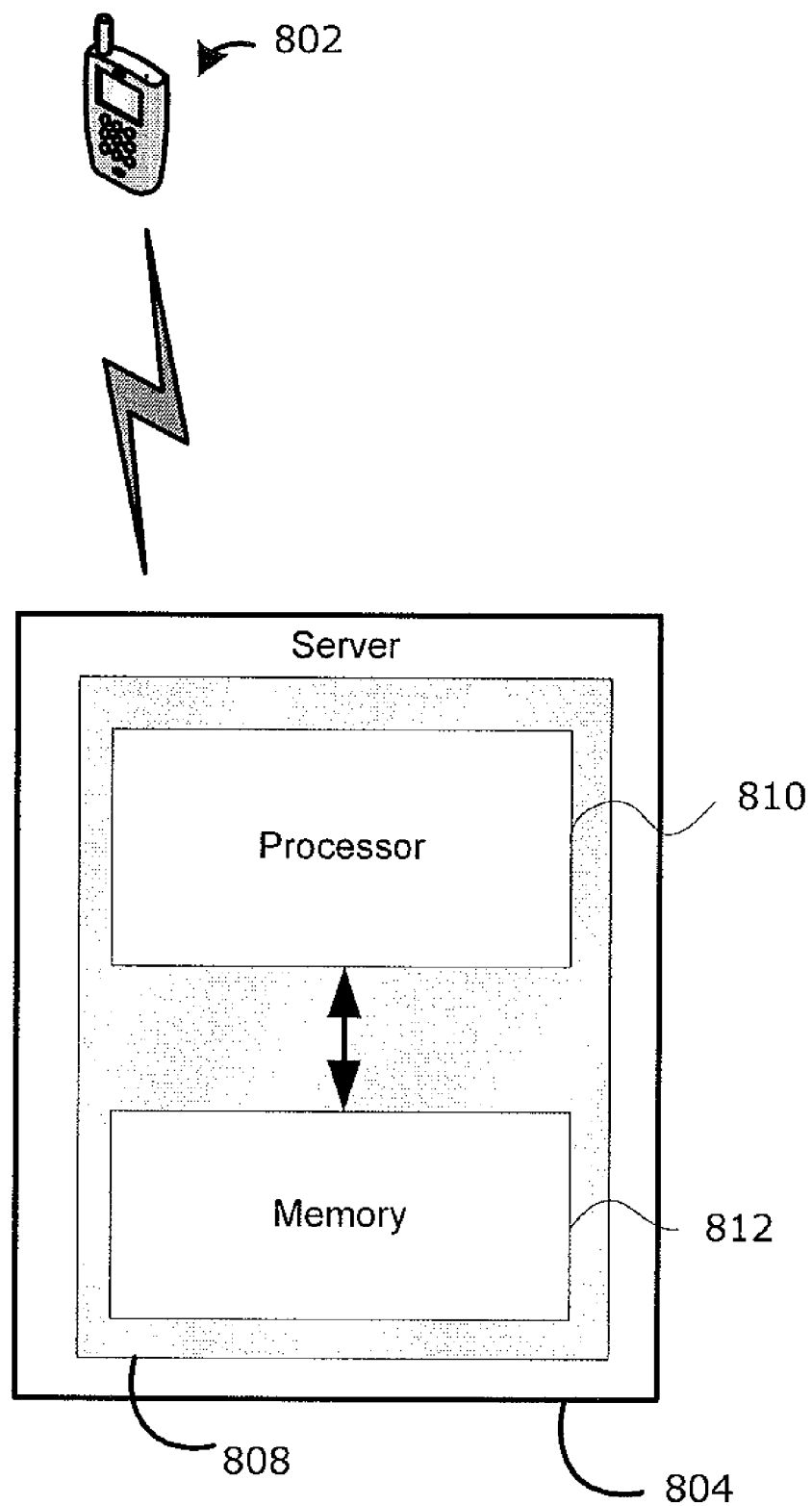
FIG. 8 shows an arrangement of electrical devices to be used in carrying out methods of the present application.

By way of example, in one embodiment, illustrated in FIG. 8, the methods described above are used to down-sample images to a size suitable for display on a display of a mobile device 802. The mobile device 802 is connected to a server 804. The mobile device 802 may be connected to the server 804 in any one of a number of methods. For example, the mobile device 802 may be connected to the server through a cellular network, a wireless wide area network (WWAN), or a wireless local area network (WLAN). It will be appreciated that other methods of connection, both wired and wireless, may also be used.

The server 804 may be an Internet gateway which provides access to the Internet. In some embodiments, the server 804 includes a transcoder 808 which is configured to down-sample images from a size M×N DCT image to a size I×J DCT image. In some embodiments, the M×N DCT images are images received from the Internet.

The transcoder 808 comprises a processor 810 and a memory 812. The processor 810 may be configured to execute the steps of any of the preceding methods to find transform matrices for down-sampling a DCT image directly in the DCT domain. The processor 810 may also be configured to down-sample a DCT image directly in the DCT domain using the transform matrices. In one embodiment, the memory 812 is used to store transform matrices. The memory 812 may also be used to store any of the optimization parameters.

The processor 810 is connected to the memory 812. In one embodiment, the processor is configured to select a spatial domain down-sampling method and to apply the selected spatial domain down-sampling method to a DCT image to produce a DCT reference image. The processor 810 may be configured to store optimization parameters which have been found to minimize or reduce the optimization problem to the memory 812.

The processor 810 may be configured to determine or further optimize transform matrices during periods when the processor is experiencing little use.

In some embodiments, the processor 810 is configured to produce a down-sampled image of size I×J according to the method illustrated in FIG. 7 and described above.

In some embodiments, the transcoder is included on the mobile device 802. The mobile device 802 also has a display for displaying images and a communication module for communicating with the server. The mobile device 802 may also include a processor connected to the communication module. The processor is configured to execute the down-sampling method illustrated in FIG. 7. That is, the processor is configured to obtain from the server the transform matrices and to determine an intermediary matrix as the product of the DCT image and one of either the row transform matrix or the column transform matrix and to determine a down-sampled DCT image of size I×J as the product of the intermediary matrix and the transform matrix which was not used in determining the intermediary matrix. This embodiment, in which the server determines and provides the transform matrices to the mobile device 802 which then performs multiplication operations using the transform matrices may be particularly useful for down-sampling images which are locally produced on the mobile device using, for example, a camera. This configuration permits a user to down-sample a locally produced image obtained using the camera to minimize the bandwidth used in transmitting the image over the network. Accordingly, in some embodiments, the mobile electronic device 802 includes a camera.

Accordingly, in one aspect the present application provides a method of down-sampling a DCT image of size M×N in the DCT domain to produce a down-sampled image of size I×J comprising steps of: a) obtaining transform matrices comprising a row transform matrix of size I×M and a column transform matrix of size N×J; b) determining an intermediary matrix as the product of the DCT image and one of either the row transform matrix or the column transform matrix; and c) determining the down-sampled DCT image as the product of the intermediary matrix and the transform matrix not used in the previous step of determining.

In another aspect, the present application provides a transcoder for transcoding a DCT image. The transcoder has a memory having transform matrices stored thereon. The transform matrices comprise a row transform matrix of size I×M and a column transform matrix of size N×J. The transcoder also includes a processor connected to the memory and configured to obtain from the memory the transform matrices, and to determine an intermediary matrix as the product of the DCT image and one of either the row transform matrix or the column transform matrix. The processor is also configured to determine a down-sampled DCT image of size I×J as the product of the intermediary matrix and the transform matrix not used in determining intermediary matrix.

In another aspect, the present application provides a mobile electronic device having a transcoder for down-sampling a DCT image. The mobile electronic device includes a display for displaying images. The mobile electronic device includes a communication module for communicating with a server and a processor connected to the communication module. The processor is configured to obtain from the server the transform matrices including a row transform matrix and a column transform matrix. The processor is also configured to determine an intermediary matrix as the product of the DCT image and one of either the row transform matrix or the column transform matrix. The processor is also configured to determine a down-sampled DCT image of size I×J as the product of the intermediary matrix and the transform matrix not used in determining the intermediary matrix.

In yet a further aspect, the present application provides a method of selecting transform matrices for use in a transcoder for down-sampling a DCT image directly in the DCT domain. The method comprises: a) obtaining a training set by applying a pre-selected down-sampling method to a DCT reference image to obtain a down-sampled DCT reference image; b) initializing the transform matrices; and c) applying a learning with forgetting algorithm to the transform matrices to obtain transform matrices which reduce a learning objective function, wherein the learning objective function is a function of the visual quality of a down-sampled DCT image obtained using the transform matrices relative to the visual quality of the down-sampled DCT reference image, and the learning objective function is also a function of the computational complexity of applying the transform matrices.

In yet another aspect, the present application provides an electronic device having a memory for storing transform matrices and a training set. The transform matrices include a row transform matrix and a column transform matrix. The training set includes at least one DCT reference image and a corresponding down-sampled DCT reference image obtained using a spatial domain down-sampling method. The electronic device also includes a processor connected to the memory for obtaining transform matrices for down-sampling a DCT image directly in a DCT domain. The processor is configured to initialize the transform matrices and to apply a learning with forgetting algorithm to the transform matrices to obtain transform matrices which reduce a learning objective function. The learning objective function is a function of the visual quality of a down-sampled DCT image obtained using the transform matrices relative to the visual quality of the down-sampled DCT reference image. The learning objective function is also a function of the computational complexity associated with down-sampling using the transform matrices.

In another aspect, the present application provides a method of selecting transform matrices for use in a transcoder for down-sampling a DCT image of size M×N to a down-sampled DCT image of size I×J directly in a DCT domain. The method comprises: a) selecting a spatial domain down-sampling method; b) applying the selected spatial domain down-sampling method to the DCT image to produce a down-sampled DCT reference image; and c) selecting transform matrices that minimize an optimization problem, wherein the optimization problem is a function of the error between down-sampled image obtained using the transform matrices and the down-sampled DCT reference image, and the optimization problem is also a function of the computational complexity of applying the transform matrices, the transform matrices comprising a row transform matrix and a column transform matrix.

In another aspect, the present application provides an electronic device. The electronic device includes a memory for storing transform matrices. The transform matrices include a row transform matrix and a column transform matrix. The electronic device further includes a processor connected to the memory for obtaining transform matrices for down-sampling a DCT image of size M×N to a down-sampled DCT image of size I×J directly in a DCT domain. The processor is configured to select a spatial domain down-sampling method and to apply the selected spatial domain down-sampling method to the DCT image to produce a DCT reference image. The processor is also configured to store transform matrices to the memory which minimize an optimization problem. The optimization problem is a function of the error between down-sampled image obtained using the transform matrices and the DCT reference image. The optimization problem is also a function of the computational complexity of applying the transform matrices to down-sample the DCT image.

Other aspects and features of the present application will be apparent to those of ordinary skill in the art from a review of the following above description when considered in conjunction with the drawings.

Certain adaptations and modifications of the invention will be obvious to those skilled in the art when considered in light of this description. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of selecting transform matrices for use in a transcoder for down-sampling a DCT image directly in the DCT domain, the method comprising:
    obtaining a training set by applying a pre-selected down-sampling method to a DCT reference image to obtain a down-sampled DCT reference image;
    initializing the transform matrices; and
    applying a learning with forgetting algorithm to the transform matrices to obtain transform matrices which reduce a learning objective function,
    wherein the learning objective function is a function of the visual quality of a down-sampled DCT image obtained using the transform matrices relative to the visual quality of the down-sampled DCT reference image, and the learning objective function is also a function of the computational complexity of applying the transform matrices.

2. The method of claim 1, wherein the step of applying the learning with forgetting algorithm comprises:
    computing a learning amount for the transform matrices; and
    adjusting the transform matrices using the learning amount.

3. The method of claim 2, wherein the steps of computing a learning amount and adjusting the transform matrices are repeated until a change in the learning objective function is less than a predetermined amount.

4. The method of claim 1, wherein the step of applying a learning with forgetting algorithm includes:
    passing an input DCT reference image from a training set forward to compute network outputs;
    computing the network error;
    propagating the network error backwards;
    computing learning amounts for the transform matrices; and
    adjusting the transform matrices using the learning amounts.

5. The method of claim 1, wherein the transform matrices comprise a row transform matrix for down-sampling the number of rows in the DCT image and a column size matrix for down-sampling the number of columns in the DCT image.

6. The method of claim 5, wherein the learning objective function is $$J_f = \|D_{IM} \cdot C_{MN} \cdot W_{NJ} - V_{IJ}\|^2 + \lambda \cdot r_g,$$

where $J_f$ is the learning objective function; $D_{IM}$ is the row transform matrix; $W_{NJ}$ is the column transform matrix; $C_{MN}$ is the DCT image; $D_{IM} \cdot C_{MN} \cdot W_{NJ}$ is the down-sampled DCT image obtained using the transform matrices; $V_{IJ}$ is a down-sampled DCT reference image obtained using another down-sampling method; $r_g$ is the computational complexity associated with using the transform matrices $D_{IM}, W_{NJ}$ to down-sample an image $C_{MN}$; and $\lambda$ is a quality and complexity trade-off parameter used to balance a trade-off between visual quality of down-sampled DCT images and the computational complexity of obtaining the down-sampled DCT images.

7. The method of claim 6, wherein the computational complexity is determined from the absolute values of all elements in the transform matrices.

8. The method of claim 1 further comprising:
    applying a selective learning with forgetting algorithm to the transform matrices, the selective learning with forgetting algorithm selectively applying a decay to elements of the transform matrices having weights less than a predetermined selective learning with forgetting threshold parameter and further minimize the learning objective function.

9. The method of claim 8, wherein the selective learning with forgetting algorithm is repeatedly applied to the transform matrices until the change in a learning objective function is less than a second predetermined threshold.

10. The method of claim 9, wherein the learning objective function used in the selective learning with forgetting algorithm is $$J_f = \|D_{IM} \cdot C_{MN} \cdot W_{NJ} - V_{IJ}\|^2 + \lambda \cdot r_q,$$

where $J_f$ is the learning objective function; $D_{IM}$ is the row transform matrix; $W_{NJ}$ is the column transform matrix; $C_{MN}$ is the DCT image; $D_{IM} \cdot C_{MN} \cdot W_{NJ}$ is the down-sampled DCT image obtained using the transform matrices; $V_{IJ}$ is the down-sampled DCT reference image obtained by down-sampling the DCT image $C_{MN}$ using another down-sampling method; $r_q$ is a measure of the selective learning with forgetting computational complexity associated with using the transform matrices $D_{IM}, W_{NJ}$ to down-sample an image $C_{MN}$; and $\lambda$ is a quality and complexity trade-off parameter which is used to obtain a desired trade-off between visual quality of the down-sampled DCT image and the computational complexity of obtaining the down-sampled DCT image.

11. The method of claim 10, wherein the selective learning with forgetting computational complexity is a function of the absolute values of all elements in the row transform matrix and the column transform matrix that are below the selective learning with forgetting threshold parameter, and wherein the step of training further comprises:
determining the selective learning with forgetting computational complexity of the transform matrices.

12. The method of claim 11, wherein the selective learning with forgetting computational complexity is also a function of the number of non-zero elements in a binary representation of elements of the transform matrices.

13. An electronic device comprising:
a memory for storing transform matrices and a training set, the transform matrices comprising a row transform matrix and a column transform matrix, the training set comprising at least one DCT reference image and a corresponding down-sampled DCT reference image obtained using a spatial domain down-sampling method; and
a processor connected to the memory for obtaining transform matrices for down-sampling a DCT image directly in a DCT domain, the processor being configured to initialize the transform matrices and to apply a learning with forgetting algorithm to the transform matrices to obtain transform matrices which reduce a learning objective function, the learning objective function being a function of the visual quality of a down-sampled DCT image obtained using the transform matrices relative to the visual quality of the down-sampled DCT reference image, and the learning objective function also being a function of the computational complexity associated with down-sampling using the transform matrices.

14. The electronic device of claim 13, wherein the processor is further configured to compute a learning amount for the transform matrices and adjust the transform matrices using the learning amount.

15. The electronic device of claim 14, wherein the processor is further configured to repeatedly compute a learning amount and adjust the transform matrices until a change in the learning objective function is less than a predetermined amount.

16. The electronic device of claim 13, wherein the learning objective function is $$J_f = \|D_{IM} \cdot C_{MN} \cdot W_{NJ} - V_{IJ}\|^2 + \lambda \cdot r_g,$$

where $J_f$ is the learning objective function; $D_{IM}$ is the row transform matrix; $W_{NJ}$ is the column transform matrix; $C_{MN}$ is the DCT image; $D_{IM} \cdot C_{MN} \cdot W_{NJ}$ is the down-sampled DCT image obtained using the transform matrices; $V_{IJ}$ is a down-sampled DCT reference image obtained using another down-sampling method; $r_g$ is the computational complexity associated with using the transform matrices $D_{IM}, W_{NJ}$ to down-sample an image $C_{MN}$; and $\lambda$ is a quality and complexity trade-off parameter used to balance a trade-off between visual quality of down-sampled DCT images and the computational complexity of obtaining the down-sampled DCT images.

17. The electronic device of claim 13 wherein the processor is further configured to apply a selective learning with forgetting algorithm to the transform matrices, the selective learning with forgetting algorithm selectively applying a decay to elements of the transform matrices having weights less than a predetermined selective learning with forgetting threshold parameter and further minimize the learning objective function.

18. The electronic device of claim 13, wherein the processor is configured to determine transform matrices when there is low processor usage.

19. The electronic device of claim 13, wherein the electronic device is a server which may be accessed by one or more wireless devices.

20. The electronic device of claim 13, wherein the DCT image is a frame of a DCT video.

* * * * *